United States Patent

Leap et al.

[11] Patent Number: 5,200,281
[45] Date of Patent: Apr. 6, 1993

[54] SINTERED BIPOLAR BATTERY PLATES

[75] Inventors: George D. Leap, Plum Boro; Hilary Moyes, Penn Hills Twp., Allegheny County, both of Pa.

[73] Assignee: Westinghouse Electric Corp., Pittsburgh, Pa.

[21] Appl. No.: 794,090

[22] Filed: Nov. 18, 1991

[51] Int. Cl.$^5$ .................. H01M 2/14; H01M 4/52; H01M 4/54; H01M 10/26

[52] U.S. Cl. .................. 429/129; 429/206; 429/219; 429/221; 429/223

[58] Field of Search ............ 429/206, 223, 219, 129, 429/221

[56] References Cited

U.S. PATENT DOCUMENTS

| | | | |
|---|---|---|---|
| Re. 25,913 | 11/1965 | Solomon et al. | 136/90 |
| 3,332,804 | 7/1967 | Zaromb | 136/90 |
| 3,853,624 | 12/1974 | Brown et al. | 429/223 X |
| 4,078,125 | 3/1978 | Brown | 429/219 X |
| 4,356,101 | 10/1982 | Jackovitz et al. | 252/182 |
| 4,605,604 | 8/1986 | Pollack et al. | 429/116 |
| 4,792,505 | 12/1988 | Moyes | 429/219 |
| 4,804,598 | 2/1989 | Jackovitz et al. | 429/254 |

FOREIGN PATENT DOCUMENTS

| | | | |
|---|---|---|---|
| 0043953 | 4/1977 | Japan | 429/206 |
| 0047941 | 4/1978 | Japan | 429/206 |

*Primary Examiner*—John S. Maples
*Attorney, Agent, or Firm*—Daniel P. Cillo

[57] ABSTRACT

A sintered bipolar battery plate (10) is made containing two porous electrodes and a central, non-porous, metallic cell separator-current collector sheet (12) where the positive electrode contains sintered particles (14) of elemental silver sintered into an expanded metal sheet (18) and the negative electrode contains sintered particles (16) of elemental iron sintered into an expanded metal sheet (18), where the positive and negative electrodes are sintered to a thin, porous, metallic connection layer (20) selected from at least one of nickel fiber or nickel powder, which is sintered to the current collector (12). This plate (10) can be placed in a case (22) containing alkali hydroxide electrolyte and having metal end plates (29) for electrical connections.

8 Claims, 3 Drawing Sheets

SINTERED BIPOLAR BATTERY PLATES

TECHNICAL FIELD

The present invention relates to a silver-iron battery constructed in a bipolar battery plate, high power configuration.

BACKGROUND OF THE INVENTION

Nickel-Aluminum dry charge reserve batteries which can use a bipolar battery plate configuration are well known, and taught by U.S. Pat. No. 4,605,604 (Pollack et al.). There, a bonding material, such as a solder, was used to attach the negative cathode and the current collector cell separator. Zinc-silver oxide bipolar reserve batteries are also known, and taught by U.S. Pat. No. Re 25,913 (Solomon et al.) and U.S. Pat. No. 3,332,804 (Zaromb). Use of a bipolar battery plate design requires careful selection of the central, bipolar, cell separator, current collector sheet, which must be electrically conductive, non-porous, lightweight, and non-reactive both to the active electrode system and to the electrolyte.

Silver electrodes and iron electrodes are well known, and taught by U.S. Pat. No. 4,792,505 (Moyes), and U.S. Pat. No. 4,356,101 (Jackovitz et al.), respectively. In the case of silver-iron batteries, a parallel, prismatic cell configuration has been standard, as taught by U.S. Pat. No. 4,078,125 (Brown), and U.S. Pat. No. 4,804,598 (Jackovitz et al.). Such parallel plate systems, however, require intercell connectors which are attached to the current collectors and which are a source of internal resistance, lowering electrical capacity and specific power. It would be highly advantageous to eliminate the intercell connectors in order to increase battery electrical capacity and specific power. It is the main object of this invention to provide such a design.

SUMMARY OF THE INVENTION

Accordingly, the invention resides in a sintered bipolar battery plate containing a porous positive electrode and a porous negative electrode, with a central, non-porous current collector having planar dimensions greater than the electrodes therebetween, characterized in that the positive electrode contains sintered particles of elemental silver sintered into an expanded metal sheet selected from the group consisting of nickel and silver, the negative electrode contains sintered particles of elemental iron sintered into an expanded nickel sheet, the current collector is solid nickel sheet, and the positive and negative electrodes are each sintered to thin, porous, metallic connection layers selected from the group consisting of nickel fiber, nickel powder and mixtures thereof, which layers are sintered to the current collector on opposite sides, providing an all sintered construction. The term "expanded" metal support or sheet (EXMET) as used herein will mean a metal sheet which is slit, punched, or the like, and then expanded or pulled to form a mesh like, opened structure of approximately from 75% to 95% porosity.

The invention also resides in a bipolar battery comprising a case within which are disposed alkali hydroxide electrolyte, at least one sintered bipolar battery plate containing a porous positive electrode, and a porous negative electrode, with a central, non-porous current collector having planar dimensions greater than the electrodes therebetween and a separator system between electrodes of the bipolar plates, the bipolar battery plate characterized in that the positive electrode contains sintered particles of elemental silver sintered into an expanded metal sheet selected from the group consisting of nickel and silver, the negative electrode contains sintered particles of elemental iron sintered into an expanded nickel sheet, the current collector is solid nickel sheet, and the positive and negative electrodes are each sintered to thin, porous, metallic connection layers selected from the group consisting of nickel fiber, nickel powder and mixtures thereof, which layers are sintered to the current collector on opposite sides, providing an all sintered construction.

The central cell separator-current collector (bipolar sheet) is preferably from 0.012 mm to 0.05 mm thick and the nickel material between the current collector and each electrode is preferably in fiber form with diameters less than 25 micrometers or in powder form with diameters preferably less than 44 micrometers. By using fibers or particles between the electrodes and control sheet, a completely unitary structure can be achieved through greater bonding due to increased surface area of contact between the flat current collector and the expanded metal and particles of the electrodes. This bipolar design eliminates intercell connectors and reduces internal resistance, resulting in high specific power. The all-sintered structure of this bipolar battery plate also provides an extremely strong and highly consolidated unitary plate, with little chance of electrode flaking or detachment. The bipolar design is particularly useful for systems requiring a battery capable of high rate discharge and recharge at high current densities. In addition, the secondary silver-iron electrochemical couple has the advantage of being highly stable with long cycle life.

BRIEF DESCRIPTION OF THE DRAWINGS

For a better understanding of the invention, conventional embodiments thereof will now be described, by way of example, with reference to the accompanying drawings, in which.

DESCRIPTION OF THE PREFERRED EMBODIMENTS

Figure 1:
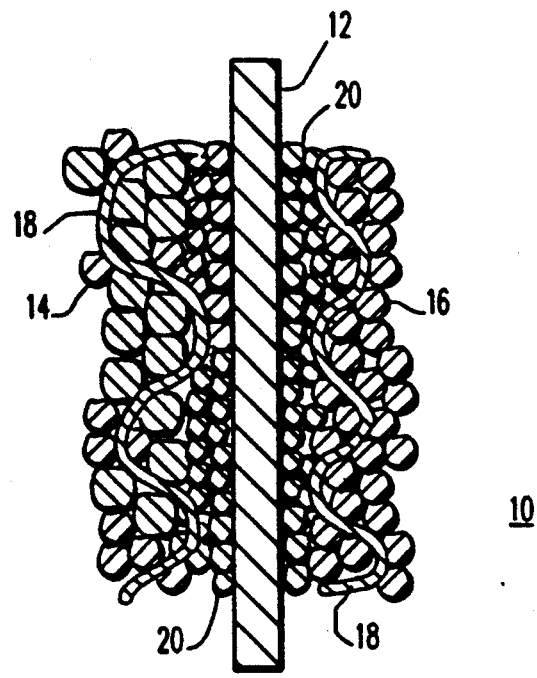
FIG. 1, which best shows the invention, is an idealized cross-sectional view of one embodiment of the silver-iron, bipolar battery plate of this invention.
Figure 2:
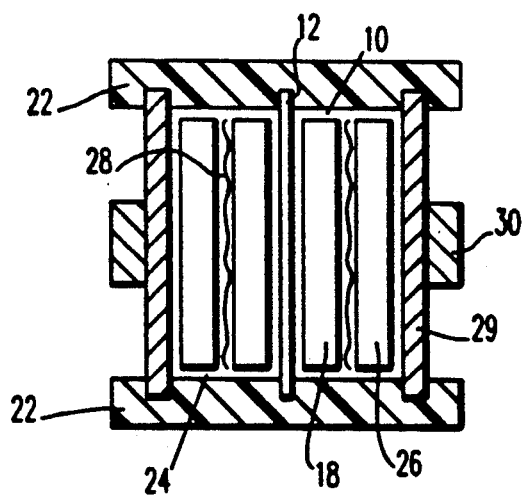
FIG. 2 is a cross-sectional view of the battery of this invention, employing silver-iron bipolar battery plates.

Referring now to FIG. 1, a bipolar battery plate 10, is shown with a solid, central non-porous, cell separator-current collector (bipolar sheet) 12, a porous, silver positive electrode 14, and a porous, iron negative electrode 16. Both electrodes contain sintered particles within an expanded metal support 18. Disposed between the electrodes and the current collector 12 is a thin, porous layer 20 of at least one of nickel fiber or nickel powder which is sintered to both the current collector 12 and the electrodes 14 and 16. Thus, the entire battery plate 10 is of a sintered construction so that all the materials have been subjected to high temperatures, and does not utilize adhesive bonding. In each battery plate, the anode of one cell is in direct electrical contact with the cathode of the next cell in the series through the metal, bipolar, cell separator-current collector sheet 12. As shown in FIG. 2, in the bipolar design, the plates are stacked tightly together with only a minimum of space between electrodes of bipolar plates for plate separators and electrolyte, where the bipolar battery plate is disposed between two dissimilar end plate electrodes. Before the battery is ready for operation, the plates are charged to convert $Ag°$ to $Ag_2$, while $Fe°$ remains as $Fe°$.

Solid nickel sheet is the only material that is to be used as the central, non-porous, current collector bipolar sheet 12. It is electrically conductive, light-weight and non-reactive both to the silver and iron active electrode system, and the alkali hydroxide electrolyte which will contact it by penetrating the electrode pores. Its thickness can range from 0.012 mm to 0.05 mm, preferably from 0.02 mm to 0.03 mm. Over 0.05 mm, the high specific power (W/kg) of the bipolar design would not be optimized. Under 0.012 mm, delivery of the power would be hampered resulting in lowered performance of the bipolar configuration. The battery housing will support the bipolar plate after manufacture and during operation.

In the bipolar battery plate fabrication, it is necessary to attach the expanded metal sheets to the central bipolar sheet prior to dry metal electrode powders being pressed onto the expanded metals and the subsequent sintering of these active materials. Also, the nickel bipolar plate 12 is sized to be larger, that is, to have planar dimensions greater than the expanded metal sheets and the active electrodes they will support. It is necessary to provide excess bipolar plate area so that the excess can be incorporated into the cell/battery housing as seen in FIG. 2, and isolate electrolyte in one cell from another.

An expanded nickel sheet is attached by sintering it onto one side of the central bipolar sheet, with short, thin diameter nickel fibers and/or fine nickel powder being positioned between the plate and the expanded nickel to effect greater bonding by increased surface area of contact between the flat plate and expanded nickel. Sintering takes place in a hydrogen environment at 1100° C. to 1150° C.

On the reverse, positive side of the bipolar plate 12, expanded nickel or silver metal is attached by sintering it to the central bipolar sheet. Again, short, thin nickel fibers and/or fine nickel particles are used to increase the surface area of contact between the flat bipolar sheet and the expanded metal sheet. The nickel fibers or particles are also introduced to ensure a single plateau performance characteristics of the silver electrode in the bipolar cell configuration as taught by U.S. Pat. No. 4,792,505, where the elemental silver oxidizes primarily to monovalent $Ag_2O$. This is due to the nickel support being effective in preventing complete oxidation to divalent AgO, thus eliminating the upper voltage plateau observed on discharge from the AgO form, resulting in only the single discharge plateau occurring in FIGS. 3 and 4. Sintering takes place in a hydrogen environment at 1100° C. to 1150° C. for nickel EXMET or at 950° C. (max) if silver EXMET is used. Silver EXMET is used when lower resistance/higher rate performance is required.

In both instances previously described, the nickel fibers used in layer 20 have diameters from 10 micrometers (0.01 mm) to 25 micrometers (0.025 mm). The fibers can be up to 20 mm long. The nickel powder used in connection layer 20 can have diameters from 1 micrometer (0.001 mm) to 74 micrometers (0.074 mm), preferably from 10 micrometers (0.01 mm) to 44 micrometers (0.044 mm). This metallic connection layer 20, between the central sheet 12 and the electrodes 14 and 18 or 16 and 18 can have a thickness of from approximately 0.005 mm to 0.2 mm, preferably from 0.01 mm to 0.05 mm. Under 0.005 mm, the stability of the expanded metal and bipolar sheet connection by way of the sintered layer 20 will be weak, over 0.2 mm, too much weight is added to the bipolar plate.

The central bipolar sheet and supporting expanded metal members are now ready for active material loading. One iron powder that can be used is generally described in U.S. Pat. No. 4,356,101, herein incorporated by reference. It is an iron oxide with a trace of sulfate made by calcining iron sulfate in an oxidizing atmosphere. After sintering in flowing hydrogen, it will be converted to elemental iron particles ($Fe°$). Also, substantially pure iron particles can be used. This material can be produced from ferric oxide ($Fe_2O_3$) by thermal reduction at from 400° C. to 1,000° C., in flowing hydrogen. In all instances the iron powder is sized to between 1 micrometer and 275 micrometers preferably from 10 micrometers to 44, diameter prior to pressing and sintering into the expanded metal structure on the negative side of the battery plate. In all cases, after sintering, the iron will be in elemental form ($Fe°$).

The silver powder that can be used is a combination of a major amount of elemental silver particles ($Ag°$) having a particle size range from 47 micrometers to 175 micrometers diameter, and a minor amount of $Ag_2O$ particles having a particle size range from 3 micrometers to 45 micrometers. The preferred weight ratio of ($Ag°$):($Ag_2O$) is from (1):(0.15 to 0.30). U.S. Pat. No. 4,792,505, herein incorporated by reference, can be referred to for complete details on this dual particulate active material. This powder when sintered in a reducing atmosphere provides a layer of porous, closely packed elemental silver ($Ag°$) particles, which on charging to activate the cell will primarily form monovalent $Ag_2O$, especially if the expanded metal into which it is pressed is nickel, with minimal formation of AgO, thus eliminating the upper voltage plateau due to any AgO reduction on discharge. Upon sintering to form elemental silver the particle size of the original powder mixture will remain substantially the same, so that small particles, 3 micrometers to 45 micrometers, of $Ag°$ are intermixed with larger particles, 47 micrometers to 175 micrometers, of $Ag°$, providing a tightly knit structure which is very strong yet very porous. It is also possible to use either all $Ag°$ particles or all $Ag_2O$ or AgO particles as the active material to be pressed into the expanded metal sheet and subsequently sintered in a reducing atmosphere.

In all cases, after sintering, the silver will be in elemental form ($Ag°$). As mentioned previously, silver expanded sheet can be used in place of nickel expanded metal sheet, in the silver electrode, when lower resistance/higher rate performance is required. As shown in FIG. 1, layer 20 of nickel particles sintered to each other at contact points and sintered to both the central sheet 12, and the expanded metal sheet 18 and particles of electrode material 14 or 16, allow excellent interparticle contact at the interface between sheet 12 and electrodes 14 and 16. In iron electrode 16, iron particles are shown as single sized particles pressed into and through the porous expanded metal support 18 to contact the particles of layer 20. In silver electrode 14, dual sized silver particles are shown pressed into and through the porous expanded metal support 18, to contact particles of layer 20. In the battery plate 10, all the particles, expanded metal supports, and central sheet are sinter connected together at metal-to-metal contact points, providing an extremely conductive, strong, rigid battery plate structure.

Referring now to FIG. 2, an iron-silver bipolar battery is shown, comprising a case 22, usually a corrosion resistant plastic such as ABS, within which are disposed alkali hydroxide electrolyte 24 between plates, at least one bipolar battery plate 10, with the elongated central current collector 12 fitting into the perimeter of the case 22 to separate cells. The end electrode 26 will be a positive electrode (silver) where the opposite electrode 18 of the bipolar battery plate is a negative electrode (iron), and vise versa. Expanded metal sheets need only be attached to one side of each of these two end plates, as shown. The electrolyte used will generally be 25 wt. % to 40 wt. % aqueous NaOH or aqueous KOH with optional addition of a minor amount of LiOH. Lower electrolyte concentrations provide higher performance but a shorter life in a bipolar battery than more concentrated electrolytes.

Between each of the bipolar battery plates 10 and between the bipolar battery plates 10 and end electrodes 26 is a thin separator system 28. The usual space for electrolyte and separator between positive and negative electrodes will be from about 0.25 mm to 1.50 mm.

The separator system 28 can be thin, ion permeable, microporous single or plural sheets of polypropylene or polyethylene. A particularly suitable separator system is a layer of low density polyethylene film, graft co-polymerized with acrylic material disposed next to the silver electrode, coupled with a layer of high density polyethylene film graft co-polymerized with acrylic material, with an optional layer of cellophane between the two. This composite separator is more completely described in U.S. Pat. No. 4,804,598, herein incorporated by reference. As can be seen in FIG. 2, the electrical terminal connections 30 to the battery are only at each metal, preferably nickel, end plate 29, which is generally thicker than the plate current collector(s) 12, and there are no intercell connectors extending from the central current collector-bipolar plate of each cell to the electrical terminals.

The following example further illustrates the invention and should not be considered limiting in any way.

EXAMPLE

Several bipolar battery plates were made and assembled to form a battery. For the bipolar battery plates, the central, cell separator-current collector bipolar sheet was 0.025 mm (25 micrometers) thick, solid, non-porous nickel sheet. An expanded nickel sheet, 7 Ni 12-2/0 EXMET about 95% porous, was attached by sintering it onto one side of the central, solid nickel bipolar sheet with nickel fibers of 0.025 mm diameter and 20 mm length being positioned between the bipolar sheet and the expanded nickel to effect greater bonding by increased surface are of contact between the flat plate and expanded nickel. Sintering was in a hydrogen environment at 1100° C.

On the reverse side of the central, solid nickel bipolar sheet expanded nickel sheet, similar to that used on the other side, was attached by sintering it to the plate. Again, similar sized nickel fibers were used to increase the surface area of contact between the flat plate and the expanded metal sheet. Sintering again took place in a hydrogen environment at 1100° C.

The central bipolar sheet, with attached supporting expanded metal members sintered to its sides through the nickel fiber layers, was ready for active material to be loaded into each side of the plate. First, a given weight of elemental iron powder, having a particle size of from approximately 10 micrometers to 44 micrometers (made by reducing $Fe_2O_3$), was pressed onto and into the expanded nickel on one side of the battery plate, at from 56.4 $kg/cm^2$ to 98.7 $kg/cm^2$ (800 lb./$in.^2$ to 1400 lb./$in.^2$), assuming a utilization of 0.42 to 0.45 Ah/g of active iron.

The expanded metal on the reverse side of the central bipolar plate was protected from compression during application of the iron powder by the use of solid metal shims of the appropriate thickness for the nickel fiber/-particle-expanded metal composite to be protected, and a neoprene pad. The rubber pad was from 0.8 mm to 1.6 mm thick and the same projected area as the expanded metal on the reverse side, whereas the metal shims surrounded the expanded metal area and coincided with the excess bipolar plate material. The compressed iron powder was sintered at 800° C. in flowing hydrogen for approximately 20 minutes to interdiffusion bond it through sintering to the EXMET and the nickel fiber sintered layer.

Next, the bipolar battery plate with iron electrode attached was turned over to reveal the other nickel fiber-expanded metal side. A mix of proportions of silver/silver oxide powder was pressed into this metallic network (with the reverse side being protected from compression by only metal shims in the excess bipolar plate area in this instance), at from 42.3 $kg/cm^2$ to 84.6 $kg/cm^2$ (600 lb./$cm^2$ to 1200 lb./$in^2$), assuming a utilization of 0.38 to 0.40 Ah/g of active silver. The compressed silver/silver oxide mass was then sintered at 400° C. in flowing hydrogen for up to 20 minutes to convert it all to $Ag^{\circ}$, and sinter interdiffusion bond it to the EXMET and the nickel fiber layer.

The silver/silver oxide blend was a mixture of approximately 1 part by weight of high purity silver metal powder of from 50 micrometers to 175 micrometers diameter with 0.25 part by weight of monovalent silver (I) oxide ($Ag_2O$) powder of from 5 micrometer to 44 micrometer particle size.

A two cell bipolar battery, similar to that shown in FIG. 2 was constructed, with a plastic housing. The separator system was a combination of low density polyethylene film (0.91 $g/cm^3$ to 0.92 $g/cm^3$) graft co-polymerized with acrylic material, cellophane film, and high density polyethylene film (0.95 $g/cm^3$ to 0.96 $g./cm^3$) graft co-polymerized with acrylic material. The electrolyte was 25% aqueous KOH with 15 g/l LiOH added.

End plates at each end of the battery were thicker than the central current collector plate, to provide adequate current collection capabilities. The end plates were made out of silver and nickel for the silver and iron electrodes, respectively. Expanded metal sheets need only be attached to one side of each of these two end plates. Electrode attachment was effected again by sintering of the flat end plate sheets to each type of expanded metal sheets with nickel fibers between the two. Fabrication of the active electrode pressed and sintered within the expanded metal member was simpler than for the bipolar battery plate because there was no expanded metal on the opposite side of the plate which needs to be protected during application of the active material. Active material for the silver and iron electrodes is added based on ≠0.38 Ah/g and ≠0.42 Ah/g utilization, respectively.

Sealing within the housing was provided by an epoxy resin adhesive. Electrolyte filling took place after evacuating the cells. Silver electrodes were charged after electrolyte filling (this is not necessary for the iron electrodes.) After the preconditioning charge cycle, the cells were re-evacuated and any displaced or lost electrolyte made up.

Specifications for the Sample A two cell bipolar battery, showing compactness of design, were as follows:

| Plate Type | Iron End Plate | Nickel Bipolar Plate | Silver End Plate |
|---|---|---|---|
| Plate material & thickness | .38 mm | .025 mm | .25 mm |
| Nickel fiber diameters for sinter attaching Exmet to plates | .025 mm | .025 mm | .025 mm |
| Nickel fiber layer(s) - thickness | .15 mm | .30 mm | .15 mm |
| Thickness of plate after sintering with fibers and Exmet layers | 0.91 mm | 1.19 mm | 0.61 mm |
| Total plate thickness after active material loading | 1.55 mm | 2.11 mm | 1.42 mm |

Figure 3:
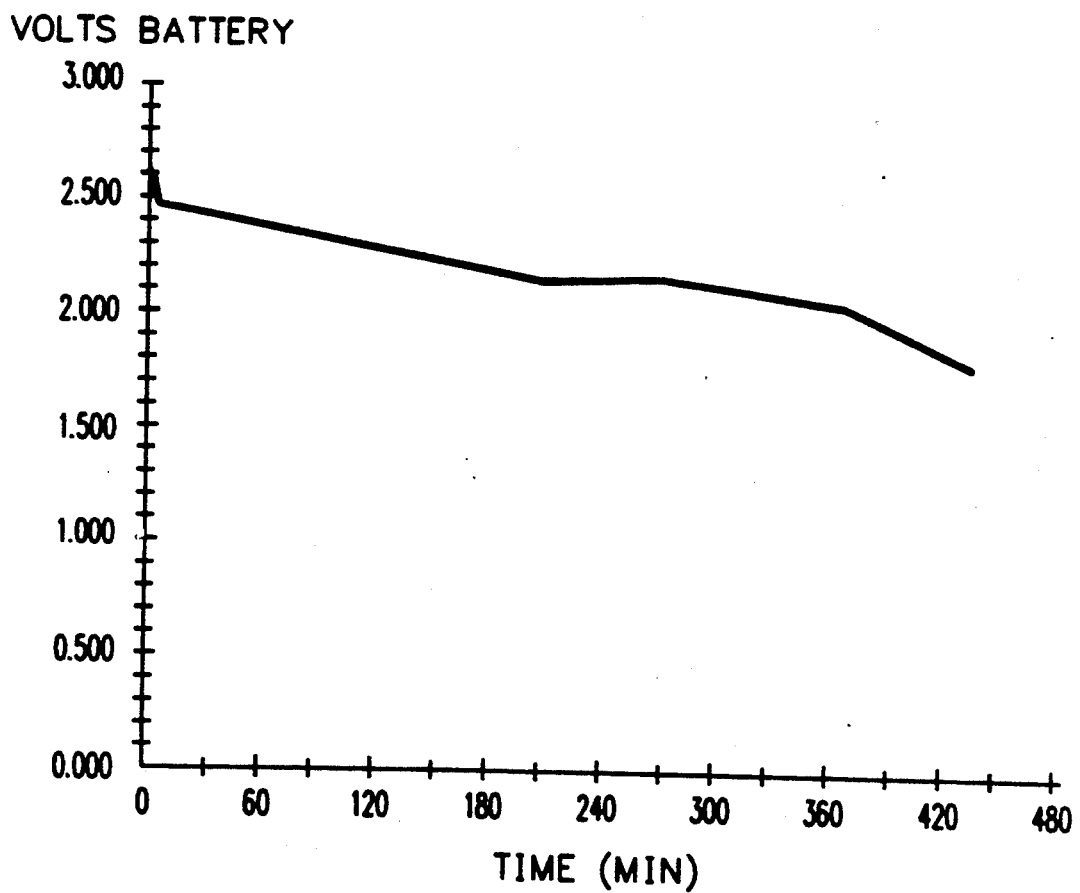
FIG. 3 is a performance plot of voltage vs. time during discharge of one bipolar battery made according to the Example.

Separator Type Between Each Fe and Ag Electrode - low and high density polyethylene graft co-polymerized with an acrylic material, with the high density layers juxtaposed to the iron electrode, and a layer of cellophane between each polyethylene layer. Interelectrode gap between each Fe and Ag Electrode = 4.88 mm
FIG. 3 shows performance data for this bipolar Sample A battery for discharge at 0.150 amp.

A similar, Sample B bipolar battery was also constructed using the same techniques and materials having the following specifications:

| Plate Type | Iron End Plate | Nickel Bipolar Plate | Silver End Plate |
|---|---|---|---|
| Plate material & thickness | .38 mm | .025 mm | .38 mm |
| Nickel fiber diameters for sinter attaching Exmet to plates | .025 mm | .025 mm | .025 mm |
| Nickel Fiber layer(s) - thickness | .025 mm | .025 mm | .025 mm |
| Thickness of plate after sintering with fibers and Exmet layers | .96 mm | 1.194 mm | .96 mm |
| Total plate thickness | 1.55 mm | 1.71 mm | 1.27 mm |

Figure 4:
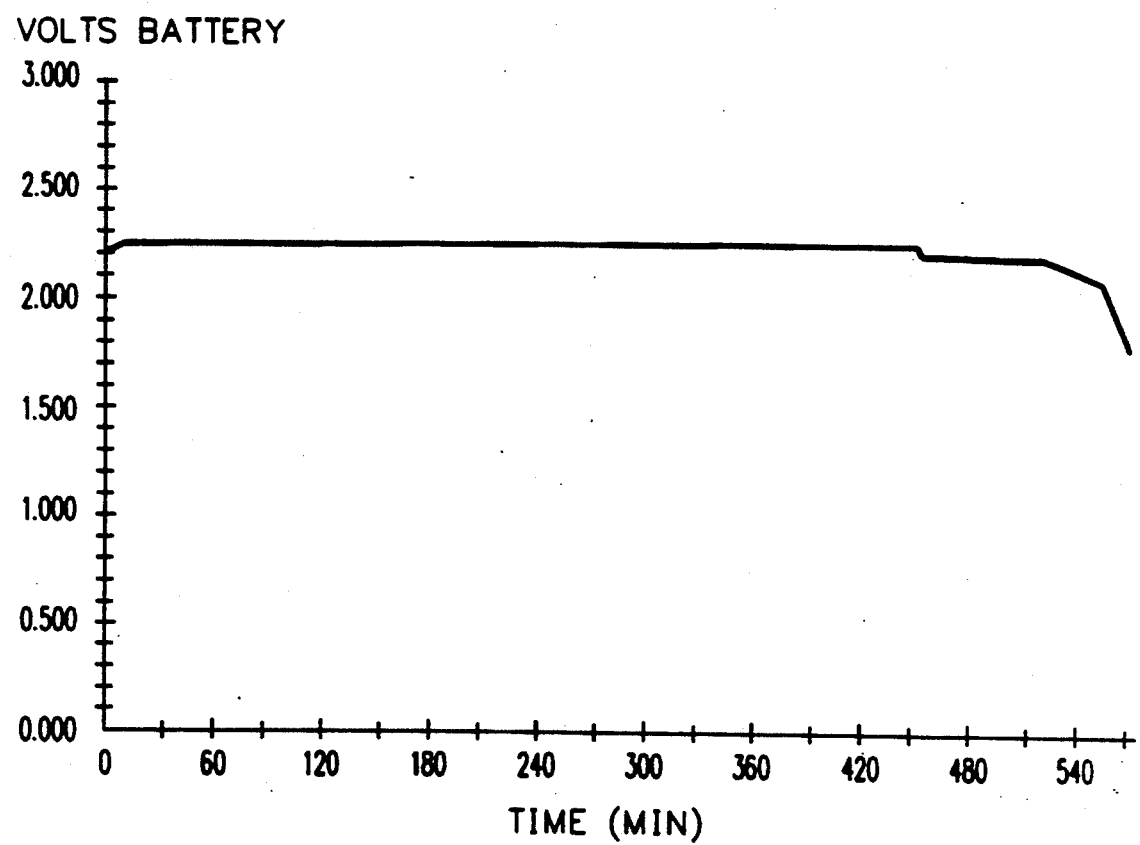
FIG. 4 is another performance plot of voltage vs. time during discharge of another bipolar battery made according to the Example.

Separator Type Between Each Fe and Ag Electrode - low density polyethylene graft co-polymerized with an acrylic material next to each electrode and a layer of cellophane between each. Intercell Gap Between Each Fe and Ag Electrode = 1.4 mm
FIG. 4 shows performance data for this bipolar Sample B battery for discharge at 0.100 amp.

Both of these plots show a stable discharge voltage with time for each of two different two-cell bipolar batteries. These voltage vs. discharge time plots illustrate performance at different cycle life values vs. the second cycle for Sample A and eighth cycle for Sample B. Performance after cycling 30 to 50 times shows no change in voltage and capacity of these two-cell bipolar batteries. The bipolar battery voltage is the composite of the two cell voltages within the single housing. Intercell connectors have been eliminated thus removing a source of internal resistance which traditionally accounts for some loss of performance in a battery of prismatic configuration.

We claim:

1. A sintered bipolar battery plate comprising a porous positive electrode and a porous negative electrode, with a central, non-porous current collector having planar dimensions greater than the electrodes, where the central current collector is between the positive electrode and the negative electrode, wherein the positive electrode contains sintered particles of elemental silver sintered into an expanded metal sheet selected from the group consisting of nickel and silver, the negative electrode contains sintered particles of elemental iron sintered into an expanded nickel sheet, the current collector is solid nickel sheet, and the positive and negative electrodes are each sintered to thin, porous, metallic connection layers selected from the group consisting of nickel fiber, nickel powder and mixtures thereof, which layers are sintered to the current collector on opposite sides, providing an all sintered construction.

2. The battery plate of claim 1, where the expanded metal sheet of each electrode is approximately from 75% to 95% porous.

3. The battery plate of claim 1, where all the particles, are sinter connected together at metal-to-metal contact points providing a rigid structure.

4. The battery plate of claim 1, where the central sheet has a thickness from 0.012 mm to 0.05 mm, fibers are present in the metallic connection layer between the central sheet and the electrodes and have diameters from 0.01 mm to 0.025 mm and lengths up to 20 mm, and the metallic connection layer has a thickness of from approximately 0.005 mm to 0.2 mm.

5. At least one battery plate of claim 1, disposed between two dissimilar end plate electrodes in a case containing alkali hydroxide electrolyte and a separator system between electrodes.

6. A bipolar battery comprising a case within which are disposed alkali hydroxide electrolyte, at least one sintered bipolar battery plate containing a porous positive electrode, and a porous negative electrode, with a central, non-porous current collector having planar dimensions greater than the electrodes, where the central current collector is between the positive electrode and the negative electrode, and a separator system between bipolar battery plates, the bipolar battery plate characterized in that the positive electrode contains sintered particles of elemental silver sintered into an expanded metal sheet selected from the group consisting of nickel and silver, the negative electrode contains sintered particles of elemental iron sintered into an expanded nickel sheet, the current collector is solid nickel sheet, and the positive and negative electrodes are each sintered to thin, porous, metallic connection layers selected from the group consisting of nickel fiber, nickel powder and mixtures thereof, which layers are sintered to the current collector on opposite sides, providing an all sintered construction.

7. The battery of claim 6, where the expanded metal sheet of each electrode is approximately from 75% to 95% porous, the particles are sinter connected together at metal-to-metal contact points providing a rigid structure, the separator system contains low density polyethylene film and high density polyethylene film, and electrical connections are made to metal end plates in the battery.

8. The battery of claim 6, where the central sheet has a thickness from 0.012 mm to 0.05 mm, fibers are present in the metallic connection layer between the central sheet and the electrodes have diameters from 0.01 mm to 0.025 mm and lengths up to 2 cm, present in the metallic connection layer between the central sheet and the electrodes have diameters from 0.001 and the metallic connection layer has a thickness of from approximately 0.005 mm to 0.2 mm.

* * * * *